United States Patent [19]
Ito et al.

[11] Patent Number: 6,077,496
[45] Date of Patent: Jun. 20, 2000

[54] POSITIVE ELECTRODE ACTIVE MATERIAL FOR NONAQUEOUS SECONDARY CELLS AND A PROCESS FOR PRODUCING SAID ACTIVE MATERIAL

[75] Inventors: Yuichi Ito; Yukio Hiraoka; Akinobu Iikawa; Masaru Nishisako, all of Honjo; Choju Nagata, Kamakura; Kenichi Harigae, Honjo, all of Japan

[73] Assignee: Dowa Mining Co., Ltd., Tokyo, Japan

[21] Appl. No.: 08/925,028

[22] Filed: Sep. 8, 1997

[30] Foreign Application Priority Data

Sep. 12, 1996 [JP] Japan ................................. 8-263602
Jul. 18, 1997 [JP] Japan ................................. 9-209697
Aug. 28, 1997 [JP] Japan ................................. 9-247652

[51] Int. Cl.$^7$ ................................................ C01G 49/00
[52] U.S. Cl. ..................... 423/594; 423/593; 423/598; 423/599; 423/600; 429/220; 429/221; 429/229; 429/218.1; 429/344
[58] Field of Search ......................... 423/265, 266, 423/592, 593, 594, 596, 598, 599, 600, 604, 605, 613, 614, 618, 624, 629, 632, 635, 641, 606, 607, 608, 610, 617, 622; 429/195, 223, 224, 194, 218

[56] References Cited

U.S. PATENT DOCUMENTS

| | | | |
|---|---|---|---|
| 4,668,595 | 5/1987 | Yoshino et al. ................ | 429/194 |
| 4,770,960 | 9/1988 | Nagaura et al. ................ | 429/194 |
| 5,264,201 | 11/1993 | Dahn et al. ................... | 423/594 |
| 5,348,822 | 9/1994 | Ovshinsky et al. ............. | 429/223 |
| 5,393,622 | 2/1995 | Nitta et al. ................... | 429/223 |
| 5,474,752 | 12/1995 | Yamamoto ...................... | 423/596 |
| 5,478,671 | 12/1995 | Idota ........................... | 429/194 |
| 5,478,673 | 12/1995 | Funatsu ......................... | 429/197 |
| 5,478,675 | 12/1995 | Nagaura ......................... | 429/224 |
| 5,571,638 | 11/1996 | Satoh et al. ................... | 429/248 |
| 5,599,642 | 2/1997 | Toshiro et al. ................. | 429/194 |
| 5,605,773 | 2/1997 | Ellgen .......................... | 429/194 |
| 5,631,105 | 5/1997 | Hasegawa et al. ................ | 429/194 |
| 5,738,957 | 4/1998 | Amine et al. ................... | 429/223 |
| 5,750,288 | 5/1998 | Xie et al. ...................... | 429/229 |
| 5,820,790 | 10/1998 | Amine et al. ................... | 252/519.1 |

OTHER PUBLICATIONS

Perry et al. Perrry's Chemical Engineer's Handbook. "Principles of Size Enlargement". McGraw–Hill: New York. Seventh Edition.. Copyright 1997. pp. 20–56—20–59.

*Primary Examiner*—Tom Dunn
*Assistant Examiner*—Cam N. Nguyen
*Attorney, Agent, or Firm*—Frishauf, Holtz, Goodman, Langer & Chick, P.C.

[57] ABSTRACT

The mixed powders of a lithium compound and a transition metal based compound are formed into shaped parts, which are packed to form a bed 6 on a porous plate 5 in the bottom of a reaction vessel 7 placed on a support 10 in a firing furnace 8 equipped with an electric heater; the packed parts are fired with an oxidizing gas such as air being forced through the bed 6 at a superficial velocity higher than a specified value via a gas feed pipe 3 connecting an air pump 1, a flow regulator 2 and a preheater 4 and the gas emerging from the bed 6 is discharged into the air atmosphere through a ventilation port 9. Even if increased amounts of the mixed powders have to be fired, the invention process enables the production of a lithium complex oxide as an active material that is homogeneous and which features excellent cell characteristics. If the manufacturing conditions are controlled such that the media diameter as a powder characteristic of the lithium complex oxide is within an appropriate range while, at the same time, the ratio of the median diameter to the specific surface area diameter is adjusted to lie within an appropriate range, one can produce an active material that has not only high initial capacity but also improved cycle characteristics.

20 Claims, 3 Drawing Sheets

POSITIVE ELECTRODE ACTIVE MATERIAL FOR NONAQUEOUS SECONDARY CELLS AND A PROCESS FOR PRODUCING SAID ACTIVE MATERIAL

BACKGROUND OF THE INVENTION

This invention relates to a positive electrode active material for use in nonaqueous electrolyte secondary cells, in particular, lithium secondary cells, as well as starting materials for said active material, and a process for producing the same.

Lithium cobalt oxide ($LiCoO_2$) is currently used as the positive electrode active material in lithium secondary cells. This active material has a capacity of 120–140 mAh/g and a cycle characteristic (life) of about 500 cycles. As recent models of electronic devices have higher performance in smaller sizes of a cellular (cordless) unit, it is required to use smaller and lighter cells as drive power supplies. One of the approaches proposed to meet this requirement is substitution of $LiNiO_2$ as the active material for positive electrode. $LiNiO_2$ has a high capacity but, on the other hand, it is short-lived. With a view to solving this problem, an attempt is being made to add elements other than Ni but no satisfactory results have been attained. It has also been proposed to optimize the particle size, granulate the active material and increase its density but with only limited success. Aside from the short life, $LiNiO_2$ has another problem in that as the production scale increases, the characteristics of the product vary not only from one lot to another but also from one portion to another within the same lot, making it difficult to manufacture powders of consistent characteristics.

Only in a small-scale synthesis of lithium complex oxide, homogeneous products can be obtained in ordinary firing furnaces supplied with an oxygen gas or air. Cells using the positive electrode active material synthesized with an increased throughput in order to achieve higher productivity have had problems such as deterioration in charge-discharge characteristics and increase deviation in characteristics.

Under the circumstances, it has been proposed in Unexamined Published Japanese Patent Application No. Hei 5-62678 to effect forced passage of a gas in order to ensure a homogeneous overall reaction despite the increased throughput of the firing operation. According to the proposal, the lithium complex oxides are synthesized in a firing furnace by firing a bed of mixed powders as it is supplied with a forced flow of air or oxygen or a mixture of oxygen and nitrogen which are heated to a specified temperature. The mixed powders are contained in a reaction vessel placed in a firing furnace equipped with an electric heater and a porous ceramic plate supporting the mixed powders is provided in the bottom of the reaction vessel. Compressed air supplied from an external air pump is preheated by a heat exchanger and supplied into the bottom of the reaction vessel such that it is forced through the bed of mixed powders. However, this increases rather than reduces the variations in characteristics.

SUMMARY OF THE INVENTION

The purpose of the invention is to improve the capacity and cycle characteristics of $Li_aNi_bM_cO_d$ containing dissimilar elements and to provide a process by which said active material for a positive electrode can be manufactured on an industrial scale without variations in energy density and cycle characteristics.

With a view to improving the capacity and cycle characteristics of the desired positive electrode active material, the present inventors paid particular attention to the structure of the particles of the active material and determined an appropriate range of $R=D_{50}/D_S$, where $D_{50}$ represents the median diameter of the particles and $D_S$ the specific surface area diameter (which is a diameter of the particles calculated from the density and the specific surface area of the particles according to the formula defined hereinafter). In order to provide an active material of the desired characteristics with R being controlled appropriately, the present inventors determined the appropriate range for the powder characteristics of either nickel hydroxide or a nickel hydroxide based coprecipitate which are to be used as the starting material, as well as the manufacturing conditions for ensuring such appropriate range. The inventors also devised an improved firing method for producing the desired powders, particularly one capable of eliminating the unwanted variations in characteristics which would otherwise occur on an increased production scale.

Lithium complex oxides are used as the positive electrode active material in nonaqueous electrolyte secondary cells. However, because they are in a powder form, their powder characteristics have certain effects on cell characteristics irrespective of whether they are essentially composed of primary crystal particles or secondary particles which are agglomerations of the primary particles. For example, an increasing particle size lowers the initial capacity but improves the cycle characteristics; in contrast, an increasing specific surface area increases the initial capacity but deteriorates the cycle characteristics. Thus, it is difficult to meet both requirements for good cycle characteristics and high initial capacity. Several proposals have been made for improving the characteristics of powders by adjusting the particle size and chemistries but no satisfactory results have been attained.

The present inventors have found that if the median diameter of particles is in an appropriate range and if the ratio R between the median diameter and the specific surface area diameter is adjusted to lie within an appropriate range, a lithium complex oxide active material can be obtained that has high initial capacity and satisfactory cycle characteristics.

It is not completely clear how in practice the ratio R which represents the powder characteristics of the active material affects its capacity and cycle characteristics. Since the effectiveness of the invention develops irrespective of whether the particles are secondary or primary in the form of single crystals, it is speculated to be attributable to the surface structure of particles at the atomic level. Higher values of capacity mean a greater amount of energy that can be stored. Lithium nickel dioxide ($LiNiO_2$) has a theoretical capacity of about 280 mAh/g. Although the currently used $LiCoO_2$ has a comparable theoretical value, the availability is only 130–140 mAh/g. Therefore, the target value of the actually available capacity for $LiNiO_2$ is set to be 150 mAh/g or more.

What is important about cycle characteristics is that if the capacity drops significantly in the initial period up to 15 cycles, the subsequent recovery of capacity is not possible, eventually leading to a shorter service life.

As the result of many trials and errors, it has been found that the drop in capacity occurring after 15 cycles is desirably not more than 12% of the initial value. Since the active materials prepared in the Examples of the present invention have capacities in the range of 150–205 mAh/g, the drop in capacity after 15 cycles is desirably not more than 18 mAh/g.

The methods of evaluating the cell characteristics will be described in the Examples.

The value of R largely depends on the powder characteristic of the starting material and the conditions for its firing, particularly, the gas passage and temperature conditions. The powder charateristics of the starting material are controlled by the method of its preparation (pH, temperature and charging conditions). During sintering, a forced gas flow is supplied into a bed packed with shaped parts of the starting material, whereby it is subjected to thorough firing reactions while achieving uniform firing throughout the bed so as to produce an active material having uniform powder characteristics.

Accordingly, in one aspect of the invention, there is provided a process for producing a starting material for the synthesis of a positive electrode active material for nonaqueous secondary cells, which comprises providing a hydroxide of nickel or a coprecipitate of nickel and at least one other element through the steps of:

supplying a reaction vessel with aqueous solutions of an alkali and a metal salt either continuously or intermittently and performing a reaction at a pH of 6.5–11 and at a temperature of not higher than 90° C., with a slurry of the reaction product in a liquid being recovered from the reaction vessel continuously or with part of the slurry being recovered intermittently;

separating the solid reaction product in the slurry from the liquid component to form a cake or paste; and washing the cake or paste to remove the unwanted component.

In another aspect of the invention, there is provided a starting material for the synthesis of a positive electrode active material for nonaqueous secondary cells, which is either a hydroxide of nickel or a coprecipitate of nickel and at least one other element, with the crystal phase being composed of at least one of alpha- and beta-phase nickel hydroxides and which has a tap density of 0.6–1.4 g/cc.

In the third aspect of the invention, there is provided a starting material for the synthesis of a positive electrode active material for nonaqueous secondary cells, which is either a hydroxide of nickel or a coprecipitate of nickel and at least one other element, with the crystal phase being composed of at least one of alpha- and beta-phase nickel hydroxides and which has a tap density of 0.6–1.4 g/cc, said starting material being produced through the steps of:

supplying a reaction vessel with aqueous solutions of an alkali and a metal salt either continuously or intermittently and performing a reaction at a pH of 6.5–11 and at a temperature of not higher than 90° C., with a slurry of the reaction product in a liquid being recovered from the reaction vessel continuously or with part of the slurry being recovered intermittently;

separating the solid reaction product in the slurry from the liquid component to form a cake or paste; and washing the cake or paste to remove the unwanted component.

In the fourth aspect of the invention, there is provided a process for producing a positive electrode active material by the steps of forming into shaped parts either mixed powders of a lithium compound and a transition metal based compound or a coprecipitate of a lithium compound and a transition metal based compound or a mixture of said mixed powders and said coprecipitate or a coprecipitate based on lithium and at least one transition metal and firing the shaped parts, an oxidizing gas being passed through a bed packed with the shaped parts.

In the fifth aspect of the invention, there is provided a process as described in the fourth aspect given above, wherein the shaped parts are fired with the oxidizing gas being forced through the bed of the shaped parts under such a condition that the atmosphere in the bed is pressurized.

In the sixth aspect of the invention, there is provided a process described in the fourth or the fifth aspect given above, where at least the internal areas of a reaction vessel which will contact the shaped parts packed in said reaction vessel are made of metallic nickel, a high nickel alloy, a nickel compound or a combination of at least two of the three substances mentioned above or alternatively made of metallic nickel or a high nickel alloy which have an oxide film formed on the surface, or the composite material comprising metallic nickel or a high nickel alloy and a nickel compound, said composite material having an oxide film formed on the surface.

In the seventh aspect of the invention, there is provided a positive electrode active material for use in nonaqueous secondary cells, which has a chemical composition represented by $Li_aNi_bM_cO_d$ (where $0.95 \leq a \leq 1.05$; $b+c=1$; $0<c<0.4$; $d \approx 2$; and M is at least one element selected from the group consisting of Co, Mn, Fe, V, Ti, Al, Sn, Zn, Cu, In, Ga, Si, Ge, Sb, B, P, K Na, Mg, Ca, Ba, Sr, W, Mo, Nb, Ta, Y and lanthanides) and which has a median diameter ($D_{50}$) of 5–30 μm, with $R=D_{50}/D_S$ ($D_S$ is a specific surface area diameter given by the formula $D_S=6/\rho \cdot S$ where $\rho$ (g/cm$^3$) is the specific gravity measured with a pycnometer and S (m$^2$/g) is the BET specific surface area) being in the range of 1.5–6.

In the eighth aspect of the invention, there is provided a positive electrode active material as described in the seventh aspect given above, which has an initial capacity of at least 150 mAh/g and experiences a capacity drop of no more than 18 mAh/g after 15 cycles.

In the ninth aspect of the invention, there is provided a process for producing a positive electrode active material for nonaqueous secondary cells which comprises:

mixing a powdered raw material with a lithium compound powder to obtain a mixed powder, wherein said powdered raw material is either a hydroxide of nickel or a coprecipitate of nickel and at least one other element, with the crystal phase being composed of at least one of alpha- and beta-phase nickel hydroxides and which has a tap density of 0.6–1.4 g/cc, forming the resulting mixed powder into shaped parts, packing a reactor with said shaped parts to provide a packed bed thereof in the reactor, firing the shaped parts, with an oxidizing gas being passed through the packed bed to thereby obtain a sintered product of the raw material, and disintegrating the sintered product into a final powdered material as a positive electrode active material for use in nonaqueous secondary cells, which has a chemical composition represented by $Li_aNi_bM_cO_d$ (where $0.95 \leq a \leq 1.05$; $b+c=1$; $0<c<0.4$; $d \approx 2$; and M is at least one element selected from the group consisting of Co, Mn, Fe, V, Ti, Al, Sn, Zn, Cu, In, Ga, Si, Ge, Sb, B, P, K Na, Mg, Ca, Ba, Sr, W, Mo, Nb, Ta, Y and lanthanides) and which has a median diameter ($D_{50}$) of 5–30 μm, with $R=D_{50}/D_S$ ($D_S$ is a specific surface area diameter given by the formula $D_S=6/\rho \cdot S$ where $\rho$ (g/cm$^3$) is the specific gravity measured with a pycnometer and S (m$^2$/g) is the BET specific surface area) being in the range of 1.5–6.

In the tenth aspect of the invention, there is provided a process for producing a positive electrode active material for nonaqueous secondary cells as described in the ninth aspect given above, wherein nonaqueous secondary cells made by using said final powdered material has an initial capacity of at least 150 mAh/g and experiences a capacity drop of no more than 18 mAh/g after 15 cycles.

In the eleventh aspect of the invention, there is provided a process for producing a positive electrode active material for aqueous secondary cells as described in the ninth or the tenth aspect above, wherein said powdered raw material is prepared through the steps of:

supplying a reaction vessel with aqueous solutions of an alkali and a metal salt either continuously or intermittently and performing a reaction at a pH of 6.5–11 and at a temperature of not higher than 90° C., with a slurry of the reaction product in a liquid being recovered from the reaction vessel continuously or with part of the slurry being recovered intermittently;

separating the solid reaction product in the slurry from the liquid component to form a cake or paste; and washing the cake or paste to remove the unwanted component.

In the twelfth aspect of the invention, there is provided a process for producing a positive electrode active material for nonaqueous secondary cells as described in the ninth or the tenth aspect given above, wherein said shaped parts are fired with the oxidizing gas being forced through the bed of the shaped parts under such a condition that the atmosphere in the bed is pressurized.

In the thirteenth aspect of the invention, there is provided a process for producing a positive electrode active material for nonaqueous secondary cells according to the ninth or the tenth aspect, wherein at least the internal areas of a reaction vessel which will contact the shaped parts packed in said reaction vessel are made of metallic nickel, a high nickel alloy, a nickel compound or a combination of at least two of the three substances mentioned above or alternatively made of metallic nickel or a high nickel alloy which have an oxide film formed on the surface, or the composite material comprising metallic nickel or a high nickel alloy and a nickel compound, said composite material having an oxide film formed on the surface.

DETAILED DESCRIPTION OF THE INVENTION

To prepare nickel hydroxide in the present invention, aqueous solutions of a nickel salt and an aqueous solution of alkali are supplied into the same reaction vessel either continuously or intermittently, with the supply of the aqueous alkali solution being adjusted to maintain a constant pH between 6.5 and 11. The solution in the reaction vessel is heated to maintain a constant reaction temperature of 90° C. or below. If necessary, the aqueous nickel salt solution and/or the alkali solution may be preliminarily heated.

The nickel salt may be selected from the group consisting of nickel nitrate, nickel sulfate and nickel chloride, and the alkali may be selected from the group consisting of NaOH, KOH, LiOH and $NH_4OH$. The reaction scheme may be expressed by $Ni^{2+}+2OH^- \rightarrow Ni(OH)_2$, in which nickel hydroxide precipitates. A by-product salt forms from the alkali ion and an acid but, being water-soluble, it does not precipitate.

There are two reasons for performing the reaction at a pH between 6.5 and 11. The first reason is to control the powder characteristics of the active material being produced and the second reason is to control the nickel hydroxide crystal phase to an alpha- and/or beta-phase. The reaction temperature is adjusted to 90° C. or below in order to prevent the formation of auxiliary compounds. If the pH is less than 6.5, a large amount of Ni salt remains unreacted to lower the efficiency of nickel hydroxide production. The elements that can be coprecipitated under the conditions set forth above are desirably supplied into the reaction vessel in the form of a solution mixed with the aqueous nickel salt solution.

The aqueous solution of the hydroxide and the salt that result from the reaction takes a slurry form, which is recovered from the top or bottom of the reaction vessel either continuously or intermittently and subjected to solid-liquid separation by means of a centrifugal dehydrator. Thereafter, the unwanted salts are washed off with purified water to yield a hydroxide cake or paste, which is dried and disintegrated a powder form.

The resulting hydroxide powder is mixed with a lithium compound, preferably lithium hydroxide, and the mixture is formed into a shaped part and fired. The fired product is a dense sinter of essentially the same geometry as the shaped part.

Figure 1:
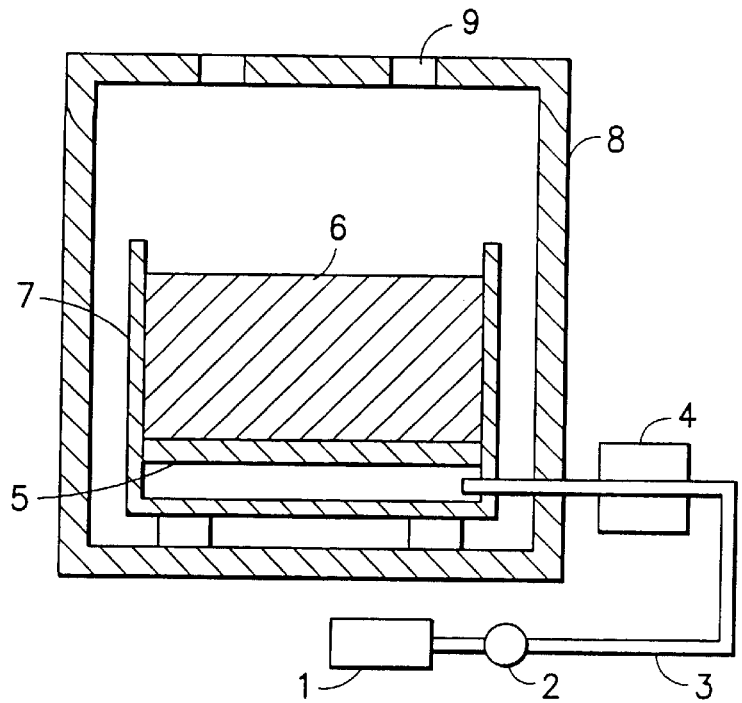
FIG. 1 is a schematic section of the updraft firing furnace used in Examples of the invention.

FIG. 1 is a schematic section of the updraft firing furnace used in Examples and the following description should be read with reference to this figure.

As illustrated, the firing furnace indicated by 8 has an electric heater and is adapted to be capable of temperature control by means of a thermocouple. The firing furnace 8 contains a reaction vessel 7 placed on a support 10 for accommodating shaped parts of mixed powders. A porous plate 5 is provided in the bottom of the reaction vessel 7. An air pump 1 for compressing the gas to be supplied and a flow regulator 2 are connected to the reaction vessel 7 by means of a gas feed pipe 3 having a preheater 4 provided halfway the path for preliminary heating of an oxidizing gas such as air.

If oxygen or other oxidizing gases are to be supplied from a high-pressure container, the air pump 1 is not used but a pressure reducing valve is substituted. The shaped parts of mixed powders are packed on top of the porous plate 5 to form a bed 6 and the oxidizing gas passing through the bed 6 is discharged into the air atmosphere via a ventilation port 9. If the gas supply pipe downstream of the preheater is made of the same material as used in the area in contact with the shaped parts, there will be no problem of contamination by extraneous elements. If the firing furnace 8 is installed within a water-cooled metal case, precise control of the process atmosphere can be accomplished by various methods; for example, the atmosphere filling gas may be charged after initial evacuation and this allows for pressurization of the atmosphere; in addition, the leakage of the atmosphere can be sufficiently suppressed to permit the optional use of a gaseous mixture having a specified compositional ratio.

The firing is performed at a temperature of 600° C. or higher. In order to produce primary particles of 5 μm or larger, the firing is desirably performed at a temperature of 800° C. or higher.

Use of the hydroxide produced in accordance with the invention ensures the production of active materials having improved cell characteristics if only R is controlled to fall within an appropriate range, irrespective of whether the particles are primary or secondary. An additional advantage is that even if the sinter has a high density, the controlled size of the primary particles and the weak grain boundaries allow the sinter to be easily disintegrated to primary particles of the required size (a particle size distribution of 1–100 μm is held to be desired as active materials, but it has been found that the suitable median diameter is in the range of 5–30 μm.).

If the tap density of the nickel hydroxide powder is less than 0.6 g/cc, there will be obtained no particles having a median diameter of at least 5 μm. Beyond 1.4 g/cc, the overgrowth of the primary particles requires the same degree of crushing as in the flux method and cracks tend to occur within the particles, thus deteriorating the cycle characteristics of the active material.

According to the invention, the starting powder is fired with an oxidizing gas being passed through it. The starting powder is formed into shaped parts of an increased density and the bed packed with the shaped parts is supplied with the oxidizing gas at a flow rate higher than a certain value. This offers the advantage that even if an increased amount of the starting powder has to be fired, a homogeneous and thorough reaction will take place in every part of the reaction vessel, yielding the desired lithium complex oxide active material having excellent cell characteristics.

The starting material may be selected from the group consisting of the oxide, hydroxide, inorganic acid salts and organic acid salts of Li. Examples of inorganic acid salts include lithium nitrate. Examples of organic acid salts include lithium acetate. In the case of producing $LiNiO_2$, the use of hydroxides as a starting material is preferred. The transition metal compound may similarly be selected from the group consisting of the oxide, hydroxide, inorganic acid salts and organic acid salts of a suitable transition metal such as nickel. Examples of inorganic acid salts include nitrates. Examples of organic acid salts include citrates. Needless to say, the compounds that are formed by a coprecipitation method and similar techniques may also be fired. The most preferred nickel compound is nickel hydroxide. The compounds of M (transition metals other than nickel and some other elements) may similarly be selected from the group consisting of oxide, hydroxide, inorganic acid, and organic acid salts, where M is at least one element selected from the group consisting of Co, Mn, Fe, V, Ti, Al, Sn, Zn, Cu, In, Ga, Si, Ge, Sb, B, P, K, Na, Mg, Ca, Ba, Sr, W, Mo, Nb, Ta, Y and lanthanides.

$Li_aNi_bM_cO_d$ stands for a solid solution of $LiNiO_2$ and M. Accordingly, the crystal structure thereof is substantially the same as that of $LiNiO_2$. Thus, "a" takes a value in the range of 0.95–1.05, and "d" is approximately equal to 2. "M" is dissolved in $LiNiO_2$ to form a solid solution to thereby prevent the deterioration in crystal structure which is to be caused by repeated cyclic use. From a stand/point of chemical composition, the dissolution of M means that part of Ni is replaced by M. Therefore, b+c=1. "M" is an element which is externally added. Therefore, "c" satisfies the relationship: 0<c. There is a limit solubility of M, which varies depending on which element M represents. If "c" becomes 0.4 or more (0.4≦c), the crystal structure will change so much as to substantially decrease the desired characteristics of active material.

The lithium compound and the transition metal compound are typically mixed with either a mixer equipped with a stirrer (e.g., an attritor, a free mixer or a concrete mixer) or with a rotary mixer (e.g., a pot mill or a V-type mixer); other types of mixer may of course be employed.

The starting powder is typically formed into shaped parts by means of the following machines but other machines may be employed depending on the shape to be obtained: (A) presses (e.g., a uniaxial press, a tableting machine, a hydrostatic press and a vibrating press); (B) a roll briquetter; (C) an extruder and (D) a rolling granulator. The shaped parts may take various forms that can be produced by customary techniques, such as spheres, lenses, rods, sheets and strands; other forms may of course be employed. A suitable size range is from 1 mm to 20 mm as measured on one side of a cross section or across its diameter. Through-holes may be bored in large shaped parts. It is important that the shaped parts have densities large enough to ensure that they will not be blown off during firing under the condition of an enforced flow. To meet this requirement, the shaped parts desirably have relative densities of at least 40% of the theoretical. As will be described in the Examples, the rating of cell capacity generally improves as the superficial velocity increases; however, at excessively low flow rates, the active material produced has a low initial capacity and suffers great capacity variations. The oxidizing gas to be supplied into the bed packed with the shaped parts of the starting powder may be selected from the group consisting of oxygen, air, a mixture of oxygen and nitrogen gases, and a nitrogen oxide gas.

The firing furnace may be modified to have more than one gas feed pipe and/or ventilation port. The ventilation port in the updraft type or the gas feed pipe in the downdraft type may be horizontal or inclined. The air feed pipe in the updraft type or the ventilation port in the downdraft type may be positioned either vertically or at an angle with respect to the bottom of the furnace. If desired, a gas diffuser may be provided at the distant end of the gas feed pipe or, alternatively, a gas collector may be fitted in the ventilation port. For pressurization, a relief valve may be provided at the ventilation port.

If the firing vessel is made of a nickel material, the entrance of foreign matter which will deteriorate the cell characteristics is prevented and an active material having excellent cell characteristics can be obtained. The nickel is used on the inner surface of the reaction vessel in at least the area of contact with the shaped parts; if desired, it may also be used on gas supply pipes. The nickel material refers principally to metallic nickel, high nickel alloys, nickel oxides and composites thereof, with the nickel oxides being optionally complex oxides. The metals or composite nickel materials may have an oxide film formed on the surface. If necessary, the firing operation may be performed through two or more stages or it may be repeated more than once. The oxidizing gas may be circulated within the reaction vessel.

The median diameter $D_{50}$ may be defined as a value corresponding to 50% on a weight cumulative distribution curve obtained by measurement by a laser scattering method. The specific surface area diameter ($D_S$) of a particle may be calculated by the equation $D_S=6/\rho \cdot S$, where S is the BET specific surface area S(m²/g) measured by using gas adsorption and ρ(g/cm³) is the specific gravity measured with a pycnometer.

The specific values of $D_{50}$ and S are controlled by the packing characteristics, the particle size of the starting powder and the method of its production, particularly the temperature and the superficial velocity.

If $D_{50}$ is smaller than 5 μm or greater than 30 μm, either the packing density or the surface property of the compound of positive electrode is not satisfactory. Therefore, $D_{50}$ is preferably in the range of 5–30 μm. Usually, R takes a value close to 1. If R ($=D_{50}/D_S$) is smaller than 1.5, the initial capacity of the positive electrode active material is unduly small and there occurs a significant drop in capacity after 15 cycles. If R is greater than 6, the initial capacity is high but the drop in capacity after 15 cycles is also very great. Therefore, R is preferably in the range of 1.5–6. The appearance of particles was determined based on the SEM photograph.

In the case of $LiNiO_2$, it has been proposed that nickel hydroxide should desirably be used as a starting transition metal compound and that the crystal phase is preferably a beta-phase. However, no proposal has been made about the crystal phases suggesting that the use of the starting materials comprising α-phase, mostly α-phase or the mixed α- and β-phases crystals would result in the active materials ensuring excellent cell characteristics. With respect to the case in which the crystal phase is a beta-phase, no proposal has been made about the powder characteristics, specific ranges of tap density and the values of R that would affect the characteristics of the active materials. In addition, no proposal has been made about tap density of not greater than 1.4 which affects the powder characteristics of the $LiNiO_2$ particles, particularly their packing property. In the present invention, the powder characteristics of the active material are controlled via the step of firing the shaped parts of the starting material to form a sinter and, hence, the tap density of the particles is a very critical factor. The powder of active material was mixed in 78 wt % with 15 wt % of a graphite powder (conductive material) and 7 wt % of a fluoroplastic powder (binder) to form a compound of a positive electrode.

Fabrication of Test Cell

Figure 4:
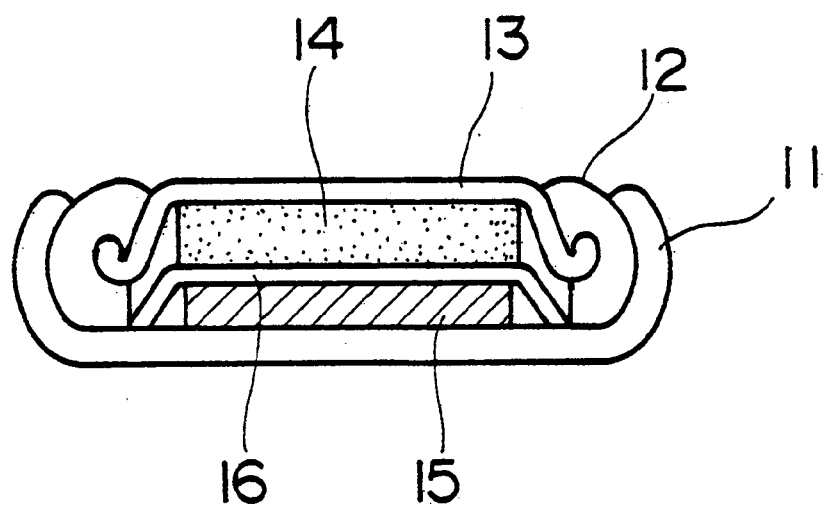
FIG. 4 is a schematic section of the coin cell fabricated as a test cell in each of the Examples of the invention and the Comparative Examples.

Using the compound of a positive electrode, a test coin cell was fabricated in order to evaluate the cell capacity of the active material. FIG. 4 is a schematic section of the fabricated coin cell (coin diameter: 20 mmφ), which comprises a stainless case 11, a sealing plate 13 made of the same material as the stainless case 11, a polypropylene gasket 12, a negative electrode 14 made of metallic lithium, a positive electrode 15 prepared by press forming of the positive electrode compound, and a microporous polypropylene separator 16.

A solvent consisting of a 1:1 (v/v) mixture of propylene carbonate and diethyl carbonate was used as an electrolyte after $LiPF_6$ was dissolved in a concentration of 1 mol/L.

A cycle test was performed at 20° C. under the following conditions: current, 2 mA; final charging voltage, 4.3 V; cut-off voltage, 2.7 V. The cell characteristics of each sample were evaluated in terms of the initial capacity per gram of the active material and the amount of deterioration (capacity drop) after 15 cycles.

EXAMPLE 1

Nickel hydroxide was synthesized from 1.5 moles/L of nickel nitrate and a 20% aqueous solution of NaOH in the following manner. The nickel nitrate was charged into a 3-L beaker, stirring the solution in the beaker at 60 rpm at a rate of 0.2 L/min. With the pH measured constantly, NaOH was injected by turning on and off the pump automatically in response to every pH change of ±0.1. In this case, the supply of NaOH was not continuous but intermittent. If necessary, NaOH may be supplied continuously at a constant ratio to nickel nitrate in the beaker.

The slurry was recovered in the form of an overflow, filtered by means of a Buchner funnel, washed and dried at 120° C. for 10 hours. The dried product was disintegrated in a mortar and sieved through a 100-mesh screen.

Figure 5:
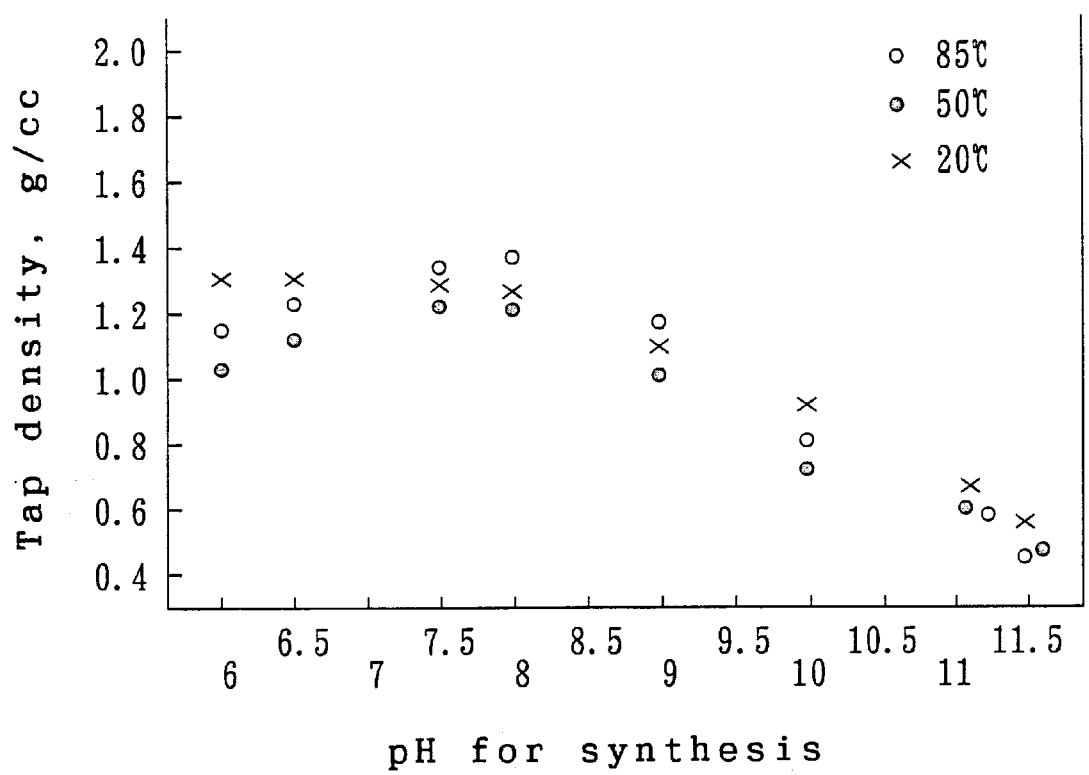
FIG. 5 is a graph showing the result of synthesis of nickel hydroxide from aqueous solutions of nickel nitrate and sodium hydroxide, with particular reference to the effects of the temperature and pH of the aqueous solutions on the tap density of the nickel hydroxide.

The tap density of the powder was measured by 1000 tappings on a 50-mL cylinder after filling it with 15 g of the powder. The results of the tap density measurements are shown in FIG. 5 as functions of the pH and the temperature employed in the synthesis of nickel hydroxide.

In the next step, a test was conducted to synthesize $LiNi_{1-x}Co_xO_2$ in the following manner. The powders of nickel hydroxide, cobalt hydroxide (2 μm) and lithium hydroxide (15 μm) were mixed in such proportions that the atomic number ratio of Ni, Co and Li was 0.8:0.2:1.0; the mixture was formed into spheres (5 mm$^\Phi$) at a pressure of 500 kg/cm² and fired at 870° C. for 15 hours in an oxygen stream. For the firing step, the spheres were packed into a nickel container in a cylindrical form having a diameter of 5 cm and a height of 20 cm and oxygen was passed through the nickel container at a superficial velocity of 5 m/min.

The sinter was disintegrated into particles by milling in a mortar for 10 minutes and the R values of the powders were calculated from their particle sizes and specific surface areas. The results are shown in Table 1. The appearance of particles was determined based on the SEM photograph. The crystal phase of each powder was evaluated by XRD (X-ray diffraction). The crystal phase of the starting hydroxide varied with the conditions of synthesis but in the case of the sinter, all samples were composed of a single phase presenting a similar profile to $LiNiO_2$. All samples of the invention had initial capacities of 170–190 mAh/g and experienced capacity drops of 5–7% after 15 cycles. In contrast, the two samples outside the scope of the invention (designated "comparative examples") had initial capacities less than 100 mAh/g with capacity drops of 15–18%.

TABLE 1

<870° C. x 15 hours    φ50 x 200H    5m/min>

| | Example | | | | | | | | Comparative Example | |
|---|---|---|---|---|---|---|---|---|---|---|
| Reaction temperature, °C. | 85 | | | 50 | | | 20 | | 20 | 85 |
| pH for synthesis | 6.5 | 8 | 10 | 6.5 | 9 | 11 | 7.5 | 10 | 11.5 | 8.5* |

TABLE 1-continued

| <870° C. × 15 hours | | | | φ50 × 200H | | | 5m/min> | | |
|---|---|---|---|---|---|---|---|---|---|
| | Example | | | | | | | | Comparative Example |
| Tap density, g/cc | 1.21 | 1.38 | 0.82 | 1.07 | 1.03 | 0.63 | 1.21 | 0.83 | 0.47 | 1.76 |
| Crystal phase | α | α > β | α > β | α | α ≈ β | β | α | α + β | β | β |
| Active material median diameter (D$_{50}$) | 15.7 | 13.6 | 10.2 | 14.2 | 14.7 | 11.4 | 15.2 | 12.3 | 4.7 | 31.2 |
| Appearance of particles | secondary | primary | secondary | primary | primary | secondary | primary | secondary | secondary | secondary ⊙ |
| R | 5.1 | 3.8 | 5.1 | 4.2 | 2.7 | 5.8 | 3.2 | 5.3 | 6.3 | 1.4 |

*5% aqueous ammonia added.
⊙ Primary particles were of a size on the order of 4 μm.

Another firing test was conducted using the same hydroxide in an oxygen stream, except that the firing temperature was 920° C. and the period was 10 hours. All sinters were found to be composed of a single phase by XRD, presenting a similar profile to LiNiO$_2$. The test results are shown in Table 2. The products synthesized in accordance with the present invention had initial capacities of 150–180 mAh/g and experienced capacity drops of 4–6% after 15 cycles. In contrast, the two samples outside the scope of the invention (designated "comparative examples") had an initial capacity of 100 mAh/g with capacity drops of 12–14% after 15 cycles.

TABLE 2

| <920° C. × 10 hours | | | | φ50 × 200H | | | 5m/min> | | |
|---|---|---|---|---|---|---|---|---|---|
| | Example | | | | | | | | Comparative Example |
| Reaction temperature, ° C. | 85 | | | 50 | | | 20 | | 20 | 85 |
| pH for synthesis | 6.5 | 8 | 10 | 6.5 | 9 | 11 | 7.5 | 10 | 11.5 | 8.5* |
| Active material median diameter (D$_{50}$) | 23.1 | 24.2 | 22.7 | 26.7 | 29.1 | 23.4 | 24.7 | 19.6 | 32.7 | 30.2 |
| Appearance of particles | primary | primary | primary | primary | primary | secondary | primary | primary | secondary ⊙ | secondary |
| R | 4.3 | 2.9 | 4.9 | 3.9 | 2.4 | 5.7 | 3.1 | 5.9 | 6.6 | 1.2 |

⊙ Primary particles were on the order of 11 μm in size.

Using three additional samples of nickel hydroxide synthesized under different conditions (50° C. and pH 9; 50° C. and pH 11; 20° C. and pH 10), a firing experiment was run in an oxygen stream at 820° C. for 24 hours. The results are shown in Table 3).

TABLE 3

| <820° C. × 24 hours | φ50 × 200H | | 10m/min> |
|---|---|---|---|
| | Example | | |
| Reaction temperature, ° C. | 50 | | 20 |
| pH for synthesis | 9 | 11 | 10 |
| Tap density | 1.03 | 0.63 | 0.83 |
| Active material median diameter (D$_{50}$) | 10.9 | 6.5 | 10.2 |
| Appearance of particles | mostly primary | primary | mostly primary |
| R | 3.5 | 5.6 | 3.2 |
| initial capacity, mAh/g | 172 | 174 | 179 |

TABLE 3-continued

| <820° C. × 24 hours | φ50 × 200H | | 10m/min> |
|---|---|---|---|
| | Example | | |
| percent drop after 15 cycles | 6 | 8 | 7 |

EXAMPLE 2

A hydroxide was prepared by coprecipitating Ni and Co in such proportions that the atomic number ratio of Ni to Co was 0.8:0.2. Then, lithium hydroxide was mixed with the coprecipitate in such proportions that the atomic number ratio of Li to the sum of Ni and Co was 1:1. The mixtures were formed into spheres as in Example 1, packed to a height of 50 cm and fired at 825° C. for 15 hours with oxygen supplied at a superficial velocity of 20 m/min. The results are shown in Table 4.

TABLE 4

| <825° C. × 15 hours | | φ50 × 500H | | 20m/min> |
|---|---|---|---|---|
| | Example | | | Comparative Example |
| Reaction temperature, ° C. | 40 | | | 80 |
| pH for synthesis | 6.5 | 8.5 | 10.5 | 8.5 |
| Tap density | 1.17 | 1.36 | 0.62 | 1.65 |
| Crystal phase | α | α ≈ β | β | α < β |

TABLE 4-continued

<825° C. × 15 hours    φ50 × 500H    20m/min>

|  | Example | | | Comparative Example |
|---|---|---|---|---|
| Active material median diameter ($D_{50}$) | 10.4 | 13.2 | 11.6 | 22.1 |
| Appearance of particles | secondary (primary 6.8) | secondary (primary 7.2) | secondary (primary 6.3) | secondary (primary 5.3) |
| R | 4.7 | 2.9 | 2.1 | 6.2 |
| Initial capacity, mAh/g | 182 | 173 | 169 | 112 |
| percent drop after 15 cycles | 8 | 7 | 6 | 21 |

EXAMPLE 3

The nickel hydroxide synthesized in Example 1 at 50° C. and pH 9 to have a tap density of 1.03 g/cc was mixed with the hydroxides of Co and other elements. The mixtures were packed to a height of 7 cm and fired at 850° C. for 20 hours with oxygen supplied at a superficial velocity of 1 m/min. Before packing, the mixtures were shaped into cylinders of 5 mm$^\Phi$ and 15 mm$^H$ by die forming at a pressure of 1 ton/cm$^2$. In this instance, BN (boron nitride) serving as both a release agent and dopant elements was added in such an amount that the atomic number ratio of Li:(Ni+M):B was 1.03:1:0.01.

TABLE 5

<850° C. × 20 hours    φ50 × 70H    1m/min>

|  | | | | | | |
|---|---|---|---|---|---|---|
|  | Ni | 0.85 | Ni | 0.88 | Ni | 0.87 |
|  | Co | 0.1 | Co | 0.1 | Co | 0.1 |
|  | Mn | 0.05 | Al | 0.01 | Mg | 0.02 |
|  | Li | 1 | Li | 1 | Li | 1 |
|  | B | 0.01 | B | 0.01 | B | 0.01 |
| Active material median diameter ($D_{50}$) | 10.7 | | 13.4 | | 10.2 | |
| Appearance of particles | primary | | secondary (primary 6.4) | | primary | |
| R | 1.8 | | 2.7 | | 3.4 | |
| Initial capacity, mAh/g | 172 | | 178 | | 162 | |
| Percent drop after 15 cycles | 8 | | 10 | | 7 | |

EXAMPLE 4

A coprecipitated hydroxide was prepared from Ni and Co in such proportions that the ratio of Ni to Co was 0.85:0.15. This hydroxide was mixed with lithium hydroxide which was weighed in such an amount that the atomic number ratio of Li to Ni+Co was 1:1. The powder mixture was then formed into near spherical shapes (5 mm$^\Phi$) on a tableting machine, packed into a cylinder (50 mm$^\Phi$×750 mm$^H$) and fired at 700° C. for 15 hours. An oxygen gas was supplied at the superficial velocities set forth in Tables 6, 7 and 8.

In the firing at temperatures on the order of 700° C., the median diameter of the sinters was determined by the median diameter of the starting coprecipitated hydroxide to fall within the range of 80–95% of the latter.

The distributions of the median diameter and specific surface area of the sinter within the reaction vessel were such that the values in various parts of the vessel were within ±6% of the respective averages; therefore, in each run, the sinter taken as a whole was pulverized and sampled for measurements of the median diameter, specific surface area, initial capacity and capacity drop after 15 cycles.

The median diameters and tap densities of the three nickel hydroxide powders were controlled by performing synthesis under the conditions set forth below.

| Median diameter, μm | Tap density, g/cc | pH | Temperature, °C. | α:β | Others |
|---|---|---|---|---|---|
| 22.5 | 1.12 | 8.5 | 80 | 3:7 | — |
| 7 | 0.81 | 9.5 | 70 | 1:9 | — |
| 35 | 1.36 | 7.5 | 60 | 6:4 | 1% ammonia added |

TABLE 6

Median diameter of hydroxide = 22.5 μm

| Superficial velocity of air, m/min | 0 | 0.5 | 15 | 50 | 100 |
|---|---|---|---|---|---|
| $D_{50}$, μm | 21.2 | 20.3 | 19.7 | 18.9 | 18.2 |
| $D_S$, μm | 14.3 | 8.2 | 4.7 | 3.4 | 2.8 |
| R (=$D_{50}/D_S$) | 1.48 | 2.47 | 4.19 | 5.55 | 6.5 |
| Initial capacity, mAh/g | 133 | 168 | 183 | 189 | 190 |
| Capacity drop after 15 cycles, mAh/g | 19 | 11 | 9 | 13 | 22 |

TABLE 7

Median diameter of hydroxide = 7 μm

| Superficial velocity of air, m/min | 0 | 0.5 | 10 | 30 | 50 |
|---|---|---|---|---|---|
| $D_{50}$, μm | 6.8 | 6.6 | 6.3 | 5..9 | 5.7 |
| $D_S$, μm | 5.2 | 4.2 | 1.96 | 1.2 | 0.92 |
| R (=$D_{50}/D_S$) | 1.3 | 1.57 | 3.21 | 4.9 | 6.2 |
| Initial capacity, mAh/g | 121 | 157 | 168 | 172 | 176 |
| Capacity drop after 15 cycles, mAh/g | 24 | 17 | 12 | 15 | 21 |

TABLE 8

Median diameter of hydroxide = 35 μm

| Superficial velocity of air, m/min | 0 | 0.5 | 70 | 150 | 200 |
|---|---|---|---|---|---|
| $D_{50}$, μm | 31.0 | 29.5 | 28.6 | 28.1 | 27.3 |
| $D_S$, μm | 21.9 | 14.9 | 7.3 | 5.8 | 4.2 |
| R (=$D_{50}/D_S$) | 1.41 | 1.98 | 3.91 | 4.84 | 6.51 |
| Initial capacity, mAh/g | 89 | 152 | 162 | 166 | 172 |
| Capacity drop after 15 cycles, mAh/g | 20 | 16 | 8 | 11 | 24 |

In each of the cases described above, the sinter powder after disintegration was comprised of secondary particles having a specific surface area of about 0.09 m$^2$/g which would inherently have assumed a value of 6 m$^2$/g if the powder were comprised of primary particles having a size of about 0.2 μm. Therefore, the median diameter of the powder represented the average value for the secondary particles. The sintering reaction did not proceed adequately at a very low superficial velocity and the unreacted Li compound formed a liquid film on the surface of the particles to cover the grain boundaries, which would probably prevent gas adsorption in surface area measurements by the BET method.

The sintering reaction was allowed to progress by increasing the superficial velocity to 0.5 m/min and higher and the unreacted Li compound formed in a smaller amount, thus achieving improvements in both the initial capacity and the cycle characteristics. On the other hand, if the superficial velocity is unduly high, sintering will progress either between or within the secondary particles to develop microcracks and the liquid electrolyte is decomposed at fractured surfaces to thereby deteriorate the cycle characteristics. Therefore, the superficial velocity is preferably controlled not to exceed 250 m/min.

The noncorrespondence between the specific surface area and the size of primary particles could be explained by another reason: the primary particles have recognizable grain boundaries under microscopic observation but probably due to the strong sintering that occurred between the particles, the gas used in the measurement by the BET method will not adsorb on the primary particles. In addition, there is no denying that the Li compound present in a trace amount covers the grain boundaries of the primary particles.

EXAMPLE 5

The powders of nickel hydroxide (tap density, 1.15 g/cc, the ratio of α-phase to β-phase, ca.1:1), tri-cobalt tetroxide ($Co_3O_4$) and lithium hydroxide (LiOH) were weighed in such proportions that the atomic number ratio between Ni, Co and Li was 0.75:0.25:1. The respective powders were mixed in an alumina pot under cooling with water for 30 minutes in the presence of IPA (isopropyl alcohol). The mixture was filtered and heated to evaporate the IPA; the residue was formed into cylinders (4 $mm^\Phi \times 6$ $mm^H$) with a tableting machine. The shaped parts (cylinders) were then put into a reaction vessel and fired at 925° C. for 15 hours. The distributions of the median diameter and specific surface area of the sinter within the reaction vessel were such that the values in various parts of the vessel were within ±4% of the respective averages; therefore, in each run, the sinter taken as a whole was disintegrated and sampled for measurements of the median diameter, specific surface area, initial capacity and capacity drop after 15 cycles. The median diameter of each lot of sinters was controlled by changing the forming pressure after repeated trials and errors.

The measuremnts were conducted for various classes of sinter's median diameter: 15 μm (forming pressure, 700 kg/$cm^2$; product density, 1.4 g/cc); 5 μm (product pressure, 150 kg/$cm^2$; product density, 1.2 g/cc) and 25 μm (forming pressure, 1.6 tons/$cm^2$; product density, 2.3 g/cc). The results of the measurements are shown in Tables 9 and 10.

TABLE 9

Sinter's median diameter on the order of 15 μm
(forming pressure, 700 kg/$cm^2$; product density, 1.4 g/cc)

| Superficial velocity of air, m/min | 0 | 0.5 | 20 | 70 | 150 | 250 |
|---|---|---|---|---|---|---|
| $D_{50}$, μm | 18.3 | 17.2 | 15.5 | 14.7 | 13.6 | 10.6 |
| $D_S$, μm | 13.5 | 8.19 | 4.8 | 3.9 | 2.77 | 1.65 |
| R (=$D_{50}/D_S$) | 1.35 | 2.1 | 3.22 | 3.77 | 4.9 | 6.4 |
| Initial capacity, mAh/g | 125 | 160 | 167 | 169 | 171 | 173 |
| Capacity drop after 15 cycles, mAh/g | 22 | 17 | 4 | 7 | 16 | 24 |

TABLE 10

Sinter's median diameter on the order of 5 μm or 25 μm

| Superficial verocity of air, m/min | 5 | 2 |
|---|---|---|
| $D_{50}$, μm | 5.4 | 26.7 |
| $D_S$, μm | 1.45 | 8.34 |
| R (=$D_{50}/D_S$) | 3.7 | 3.2 |
| Initial capacity, mAh/g | 178 | 164 |
| Capacity drop after 15 cycles, mAh/g | 8 | 3 |

In Example 5, all sintered samples, except the one having a median diameter of the 15 μm class which was prepared at a superficial air velocity of 250 m/min, had an appearance resembling primary particles. Therefore the specific surface area diameter should have been substantially the same as the median diameter and, hence, R should have assumed a value close to unity. In fact, however, the appropriate value of R was within the range of 2.1–4.9. No exact reason can be postulated to explain this phenomenon.

EXAMPLE 6

The hydroxides of Ni, Co, Al, Mg and Li were mixed in such proportions that the atomic number ratio of the respective elements was 0.90:0.08:0.05:0.01:1. Two of such mixtures were formed into rectangular parallelopipeds (6×6×15 mm) at a pressure of 500 kg/$cm^2$ and fired at 830° C. for 24 hours with oxygen supplied under two different conditions. The nickel hydroxide had a tap density of 1.27 g/cc and a ratio of α-phase to β-phase of 7:3 and the cobalt hydroxide had a tap density of 0.95 g/cc.

| | Condition 1 | Condition 2 |
|---|---|---|
| Height of packing bed | ca. 350 mm (50 $mm^\Phi$) | ca. 50 mm (50 $mm^\Phi$) |
| Superficial velocity | 4 m/min | 0.2 m/min |
| Active material Median diameter | 5.2 | 0.7 |
| Appearance of particles | secondary | secondary |
| R | 3.46 | 3.81 |
| Initial capacity, mAh/g | 159 | 172 |
| Capacity drop after 15 cycles, mAh/g | 6 | 9 |

EXAMPLE 7

The powders of a coprecipitated hydroxide (Ni:Co= 0.8:0.2 in atomic number ratio; tap density=0.76, ratio of α-phase to β-phase=4:6), a complex oxide ($B_2O_3.Al_2O_3$) and lithium hydroxide were mixed in such proportions that the atomic number ratio of (Ni+Co), (B+Al) and Li was 0.97:0.03:1. The mixture was formed into shapes and fired at 850° C. for 24 hours with oxygen being supplied at a pressure of 7 kg/$cm^2$ and a superficial velocity of 3 m/min; as a result, an active material was produced that had an R value of 4.3 ($D_{50}/D_S$=11.7 μm/2.72 μm) and an initial capacity of 168 mAh/g, which decreased by 3 mAh/g after 15 cycles.

EXAMPLE 8

Lithium hydroxide (LiOH.$H_2O$) powder as a Li supply and a coprecipitated hydroxide powder as a transition metal supply (tap density, 0.96 g/cc, ratio of α-phase to β-phase= 3:7) having a Ni to Co atomic number ratio of 85:15 were weighed in such proportions that the atomic number ratio of Li to (Ni+Co) was 1:1 and the two powders were mixed. The mixed powders were then formed into near spherical shapes (5 mm$^\phi$) with a tableting machine and packed in a weight of about 2 kg on the nickel oxide porous plate in the bottom of the reaction vessel made of metallic nickel; the packing height was 7.5 cm.

Figure 3:
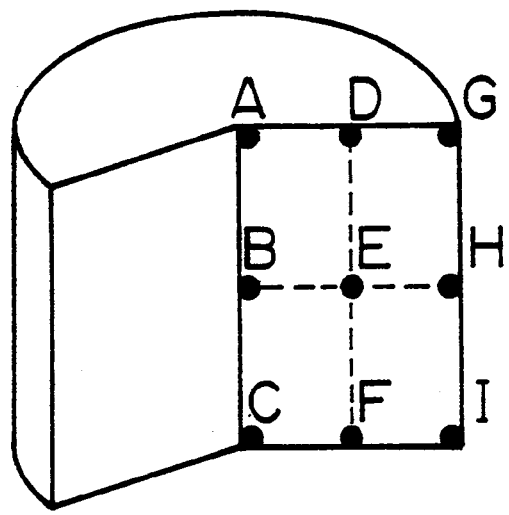
FIG. 3 is a perspective view showing the positions of sampling the active material fired in the Examples of the invention and the Comparative Examples.

The packed spheres were fired at 750° C. for 10 hours, with oxygen being supplied at a flow rate (L/min) calculated by the cross-sectional area times superficial velocity. After the firing, portions of the sinter were sampled from positions A, E and I of the bed packed with the shaped parts (see FIG. 3) and each sampled portion was crushed to particles of −150 mesh. The results are shown in Table 11.

TABLE 11

| Sampling position | Initial capacity (mAh/g) and drop after 15 cycles | | | |
|---|---|---|---|---|
| | Average superficial velocity, m/min | | | |
| | 0.3 | 0.5 | 5 | 30 |
| A | 131-21 | 160-13 | 172-11 | 183-9 |
| E | 147-17 | 174-10 | 186-5 | 191-5 |
| I | 109-16 | 153-9 | 169-6 | 182-5 |

Within each sample population, the differences in initial capacity were within the range of ±4 to ±7% of the average at superficial velocities of 0.5 m/min and above. A certain improvement was achieved at 0.3 m/min but the cell characteristics were not satisfactory; therefore, the superficial velocity has to be at least 0.5 m/min.

At the end of the firing, the packing height of the shaped parts had decreased to about 5 cm; however, the level difference of the top of the bed was within 5 mm and the fired shapes remained spherical. There were no abnormal events such as slumping of the top of the bed just beneath the ventilation port due to channelling of the supplied oxygen. The inner surfaces of the nickel vessel turned somewhat black but no spalling or adhesion occurred. Various parts of each lot were examined by powder X-ray diffraction and neither foreign matter nor secondary phase was detected. The maximal clearance between the inside lateral surface of the nickel vessel and the bed of shaped parts was 2 mm at position G.

EXAMPLE 9

In order to provide for pressurization of the firing atmosphere, the firing furnace was installed within a pressure vessel and after displacing the air atmosphere with a vacuum pump, oxygen gas was supplied to establish a specified internal pressure. Except for these modifications, an experiment was conducted under the same conditions as in Example 1 including the reaction vessel, shaped parts and their packing. Oxygen was supplied with the main pressure being set at a higher value than the internal pressure so as to provide an average superficial velocity of 5 m/min. The velocity in this case was not of the value actually measured on pressurized oxygen but the flow (L/min) through the flow regulator divided by the cross-sectional area of the vessel. The oxygen supplied was not circulated but simply discharged into the air atmosphere.

The firing operation was performed at 750° C. for 10 hours with the pressure in the furnace (kg/cm$^2$ gage) being varied from 0.5 to 15 kg/cm$^2$ and the obtained samples were used to fabricate coin cells for evaluation of the cell capacity. The results are shown in Table 12.

TABLE 12

| Sampling position | Initial capacity (mAh/g) and drop after 15 cycles | | | |
|---|---|---|---|---|
| | Internal furnace pressure, kg/cm$^2$ gage | | | |
| | 0.5 | 2 | 5 | 15 |
| A | 174-9 | 183-7 | 190-5 | 196-4 |
| E | 189-8 | 191-6 | 195-4 | 203-3 |
| I | 172-6 | 179-5 | 187-5 | 195-4 |

The same test was conducted, with the firing conditions being changed to 900° C.×10 hours. The results are shown in Table 13.

TABLE 13

| Sampling position | Initial capacity (mAh/g) and drop after 15 cycles | | | |
|---|---|---|---|---|
| | Internal furnace pressure, kg/cm$^2$ gage | | | |
| | 0.5 | 2 | 5 | 15 |
| A | 169-9 | 174-8 | 182-4 | 188-4 |
| E | 172-7 | 179-7 | 185-5 | 191-4 |
| I | 170-8 | 180-7 | 187-4 | 190-3 |

Even when the firing was performed under pressurized conditions, the results were the same as in Example 1. The inner surfaces of the nickel vessel were completely covered with a black skin but there was no occurrence of troubles such as spalling and cracking. Within each sample population, the differences in initial capacity were within the range of ±4 to ±6%.

EXAMPLE 10

Figure 2:
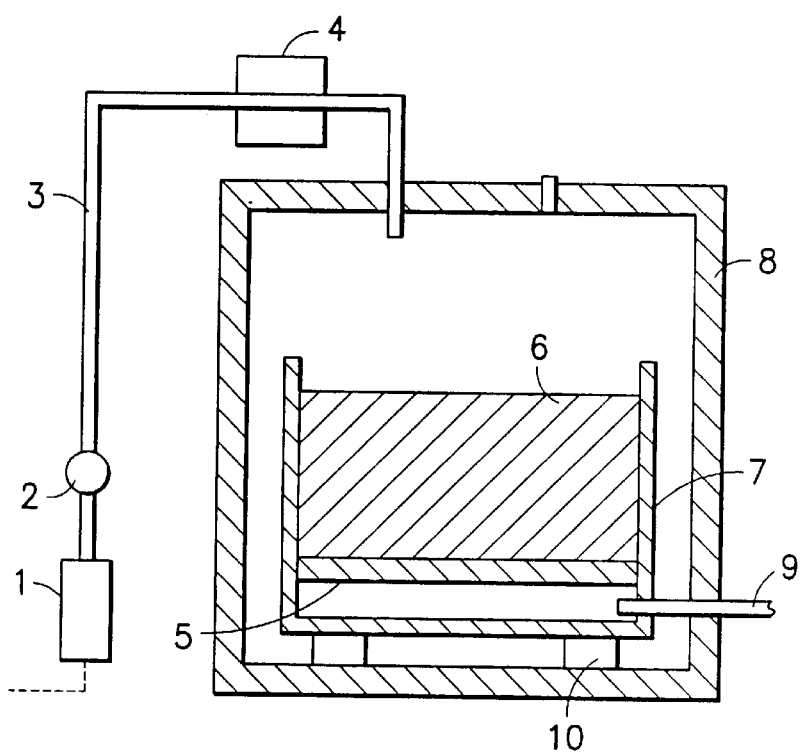
FIG. 2 is a schematic section of the downdraft firing furnace used in Example 10 of the invention.

In Example 8 and 9, the samples taken from the upper region of the packed bed of shaped parts were rather low in cycle characteristics. To deal with this situation, a downdraft firing furnace 8 of the type shown in FIG. 2 was used such that an oxidizing gas was supplied from the top of the firing furnace 8 and passed through the packing bed 6 and the porous plate 5 to be discharged into the air atmosphere. To prevent gas leakage, joints and other leaky sites of the firing furnace were sealed; when the firing was to be performed under pressurized conditions, the firing furnace was installed within a pressure vessel as in Example 9.

Two firing temperatures (720° C. and 875° C.) were employed; the firing time was fixed at 10 hours. The results of evaluation of the initial capacity and the capacity drop after 15 cycles are shown in Table 14.

TABLE 14

| Initial cpacity (mAh/g) and drop after 15 cycles | | | | |
|---|---|---|---|---|
| Firing temperature, ° C. | | 720 | | 875 |
| Internal furnace pressure, kg/cm$^2$ | 0.1 | 3 | 7.5 | 5 |
| Average superficial velocity, m/min | 10 | 7 | 5 | 10 |
| Sampling position A | 173-6 | 186-4 | 194-3 | 197-3 |
| E | 188-5 | 192-4 | 205-3 | 198-3 |
| I | 177-7 | 187-6 | 197-4 | 195-4 |

EXAMPLE 11

A lithium containing complex oxide of Ni and Co is currently used as a positive electrode material in lithium secondary cells. In Example 11, combinations of nickel with elements other than cobalt were selected by employing, for example, the combinations of nickel hydroxide/manganese oxy-hydroxide, nickel hydroxide/magnesium hydroxide, and nickel hydroxide/tricobalt tetroxide/boron oxide. Shaped parts of these starting materials were fired at various temperatures, times, internal pressures and superficial velocities (see Table 15); using the obtained samples, coin cells were fabricated and measurements were conducted for the initial capacity and the capacity drop after 15 cycles. The results are shown in Table 15.

TABLE 15

| Initial cpacity (mAh/g) and drop after 15 cycles | | | | | | | |
|---|---|---|---|---|---|---|---|
| Starting material's composition, mol % | Ni 95 | Mn 5 | Ni 98 | Mg 2 | Ni 79 | Co 20 | B 1 |
| Firing temperature (° C.) and time (h) | 800 × 10 | | 750 × 5 | | 850 × 15 | | |
| Internal furnace pressure (kg/cm$^2$) and superficial velocity (m/min) | 0.5 × 3 | | 2.5 × 1.5 | | 7 × 5 | | |
| Sampling position A | 157-11 | | 168-12 | | 183-6 | | |
| E | 160-8 | | 172-9 | | 190-4 | | |
| I | 153-8 | | 167-11 | | 179-4 | | |

EXAMPLE 12

In Examples 8–11, spheres having a diameter of 5 mm were fired. In Example 12, the shaped parts to be fired were changed to either small pieces measuring 5 mm×20 mm×1 mm that were formed by a roll briquetter or strands extruded in a diameter of 4 mm. These parts were sintered using the same composition and apparatus as in Example 1, except that the average superficial velocity was 3 m/min and the firing temperature and time were 750° C. and 7 hours, respectively. Using the sintered samples, cells were fabricated and measurements were conducted for the initial capacity and the capacity drop after 15 cycles. The results are shown in Table 16.

TABLE 16

| | Initial capacity (mAh/g) and drop after 15 cycles | |
|---|---|---|
| Shaped part { apparatus size and shape | Roll briquetter 5 mm$^W$ × 20 mm$^L$ × 1 mm$^T$ | Extruder 4 mm$^\phi$ strand |
| Sampling position A | 167-11 | 170-8 |
| E | 179-8 | 176-7 |
| I | 162-9 | 168-7 |

EXAMPLE 13

If Ni is used as the principal transition metal, oxygen is suitably supplied into the bed packed with shaped parts of starting powder mixtures; however, depending on the case, chemical species other than oxygen may also be contained in the gas to be supplied. To test this case, Ni and Co were coprecipitated at a molar ratio of 70:30 to form a hydroxide powder, which was mixed with the powder of LiOH.H$_2$O, followed by press forming into shaped parts (10 mm$^\phi$×5 mm$^T$) and sintering at 700° C. for 15 hours. Air was supplied into the bed of the shaped parts by means of an air pump at a superficial velocity of 10 m/min. Using the sintered samples, cells were fabricated and measurements were conducted for the initial capacity and the capacity drop after 15 cycles. The results are shown in Table 17.

TABLE 17

| Initial capacity (mAh/g) and drop after 15 cycles | | |
|---|---|---|
| Sampling position | A | 162-5 |
| | E | 166-4 |
| | I | 159-5 |

EXAMPLE 14

The procedure of Example 8 was repeated, except that the size of the firing furnace was increased to check for the occurrence of increased variations in cell characteristics.

| | Condition 1 | Condition 2 |
|---|---|---|
| Diameter of firing furnace | 1000 mm | 500 mm |
| Packing height | 200 mm | 600 mm |
| Superficial velocity | 5 m/min | 25 m/min |
| Sampling position | | |
| A | 176-10 | 180-11 |
| E | 184-7 | 187-7 |
| I | 171-9 | 184-9 |

Obviously, cell characteristics comparable to those obtained in Example 8 were reproduced without any substantial variations at various positions of the firing furnace. It was therefore clear that the process of the invention allowed the desired active material to be produced at an industrial expanded scale of firing without suffering from the unwanted variations in cell characteristics which would otherwise occur in the conventional techniques.

As described on the foregoing pages, the present invention provides a process for producing a lithium-nickel based complex oxide as a positive electrode active material by mixing a nickel hydroxide powder with the powder of a lithium compound, forming the mixed powders into shaped parts and firing the shaped parts; the process is characterized in that in order to control the powder characteristics of the nickel hydroxide used as a starting material and its crystalline structure, the pH, temperature and other process parameters for the synthesis of nickel hydroxide are regulated such that the active material powder having a median diameter in the range of 5–30 μm and the $D_{50}/D_S$ ratio R in the range of 1.5–6 are obtained; thus, the process of the invention provides a positive electrode active material that has excellent cell characteristics as exemplified by high initial capacity and small capacity drop after 15 cycles.

In another aspect of the invention, the mixed powders of starting materials are formed into shapes of an increased density and a bed packed with the shaped parts is fired with an oxygen-containing gas being forced through the bed at a flow rate higher than a certain value; therefore, even if increased amounts of powders have to be fired, a homogeneous reaction will take place in every part of the reaction vessel without scattering of the powders and channelling of the oxygen-containing gas, thereby ensuring that lithium complex oxides having excellent cell characteristics can advantageously be synthesized as positive electrode active materials on an industrial scale.

What is claimed is:

1. A positive electrode active material for use in a nonaqueous secondary cell, the positive electrode active material having a chemical composition represented by the formula $Li_aNi_bM_cO_d$, where $0.95 \leq a \leq 1.05$; $b+c=1$; $0<c<0.4$; $d=2$; and M is at least one element selected from the group consisting of Co, Mn, Fe, V, Ti, Al, Sn, Zn, Cu, In, Ga, Si, Ge, Sb, B, P, K, Na, Mg, Ca, Ba, Sr, W, Mo, Nb, Ta, Y and a lanthanide, and which has a median diameter ($D_{50}$) of 5 to 30 μm, with a ratio $R=D_{50}/D_S$ being 1.5 to 6, wherein $D_S$ is a specific surface area diameter of the formula $Ds=6/\rho \cdot S$ where ρ measured in $g/cm^3$ is the specific gravity measured with a pycnometer and S measured in $M^2/g$ is the BET specific surface area, said positive electrode active material having an initial capacity of at least 150 mAh/g and experiencing a capacity drop of no more than 18 mAh/g after 15 cycles.

2. A process for producing a positive electrode active material according to claim 1, said positive electrode active material being useful in a nonaqueous secondary cell, said process comprising:

mixing a powdered raw material with a lithium compound powder to obtain a mixed powder, wherein said powdered raw material is either a hydroxide of nickel or a coprecipitate of nickel and at least one other element, having a crystal phase comprising at least one of alpha-phase nickel hydroxide and beta-phase nickel hydroxide and which has a tap density of 0.6 to 1.4 g/cc, forming the resulting mixed powder into shaped parts, packing a reactor vessel with said shaped parts to provide a packed bed thereof in the reactor vessel, wherein at least the internal area of said reactor vessel which contacts the shaped parts packed in said reactor vessel is made of a material selected from the group consisting of metallic nickel, a high nickel alloy, a nickel compound and a combination of at least two of said metallic nickel, said high nickel alloy and said nickel compound, firing the shaped parts, with an oxidizing gas being passed through the packed bed to thereby obtain a sintered product of the raw material, and disintegrating the sintered product into a final powdered material as the positive electrode active material for use in a nonaqueous secondary cell.

3. The process for producing a positive electrode active material for nonaqueous secondary cells according to claim 2, wherein said final powdered material has characteristics such that a nonaqueous secondary cell using said final powdered material has an initial capacity of at least 150 mAh/g and experiences a capacity drop of no more than 18 mAh/g after 15 cycles.

4. The process for producing a positive electrode active material for an aqueous secondary cell according to claim 2 or 3, wherein said powdered raw material is prepared by the steps of:

continuously or intermittently supplying the reaction vessel with an aqueous solution of an alkali and an aqueous solution of a metal salt and carrying out a reaction at a pH of 6.5–11 and at a temperature of not higher than 90° C., to form a slurry of the resultant solid reaction product in a liquid and recovering the slurry from the reaction vessel continuously or part of the slurry being recovered intermittently;

separating the solid reaction product in the slurry from the liquid component to form a cake or a paste; and washing the cake or the paste to remove undesired components.

5. The process for producing a positive electrode active material for a nonaqueous secondary cell according to claim 2, wherein said shaped parts are fired with the oxidizing gas being forced through the bed of the shaped parts at a positive gauge pressure.

6. The process according to claim 5, wherein said positive gauge pressure is 0.5 to 15 $kg/cm^2$ gauge.

7. The process for producing a positive electrode active material for a nonaqueous secondary cell according to claims 2 or 3, wherein said shaped parts are fired with the oxidizing gas being forced through the bed of the shaped parts at a pressure which is higher than atmospheric pressure.

8. The process according to claim 2, wherein said oxidizing gas is made to flow at a superficial velocity in a column of not less than 0.5 m/min.

9. The process according to claim 2, wherein said M is at least one element selected from the group consisting of Co, Mn, Al, B and Mg.

10. The process according to claim 2, wherein said M is at least one element selected from the group consisting of Co, Mn and B.

11. The process according to claim 2, wherein said M is at least one element selected from the group consisting of Co, Al and B.

12. The process according to claim 2, wherein said M is at least one element selected from the group consisting of Co, Mg and B.

13. The positive electrode active material according to claim 1, wherein said M is at least one element selected from the group consisting of Co, Mn, Al, B and Mg.

14. The process according to claim 4, wherein the shaped parts are fired with the oxidizing gas being forced through the bed of the shaped parts at a guage pressure of 0.5 to 15 $kg/cm^2G$.

15. The positive electrode active material according to claim 1, wherein said M is at least one element selected from the group consisting of Co, Al and B.

16. The positive electrode active material according to claim 1, wherein said M is at least one element selected from the group consisting of Co, Mg and B.

17. A nonaqueous electrolyte lithium secondary cell having a positive electrode comprising a positive electrode active material, the positive electrode active material having a chemical composition represented by the formula $Li_aNi_bM_cO_d$, where $0.95 \leq a \leq 1.05$; $b+c=1$; $0<c<0.4$; $d=2$; and M is at least one element selected from the group consisting of Co, Mn, Fe, V, Ti, Al, Sn, Zn, Cu, In, Ga, Si, Ge, Sb, B, P, K, Na, Mg, Ca, Ba, Sr, W, Mo, Nb, Ta, Y and a lanthanide, and which has a median diameter ($D_{50}$) of 5 to 30 μm, with a ratio $R=D_{50}/D_S$ being 1.5 to 6, wherein $D_S$ is a specific surface area diameter of the formula $D_S=6/\rho \cdot S$ where ρ measured in $g/cm^3$ is the specific gravity measured with a pycnometer and S measured in $m^2/g$ is the BET specific surface area, said positive electrode active material having an initial capacity of at least 150 mAh/g and experiencing a capacity drop of no more than 18 mAh/g after 15 cycles.

18. The nonaqueous electrolyte lithium secondary cell according to claim 17, wherein said M is at least one element selected from the group consisting of Co, Mn, Al, B and Mg.

19. A nonaqueous electrolyte lithium secondary cell having a positive electrode comprising a positive electrode active material, the positive electrode active material being produced by a process comprising:

mixing a powdered raw material with a lithium compound powder to obtain a mixed powder, wherein said powdered raw material is either a hydroxide of nickel or a coprecipitate of nickel and at least one other element, having a crystal phase comprising at least one of alpha-phase nickel hydroxide and beta-phase nickel hydroxide and which has a tap density of 0.6 to 1.4 g/cc, forming the resulting mixed powder into shaped parts, packing a reactor vessel with said shaped parts to provide a packed bed thereof in the reactor vessel, firing the shaped parts, with an oxidizing gas being passed through the packed bed to thereby obtain a sintered product of the raw material, and disintegrating the sintered product into a final powdered material as the positive electrode active material, the positive electrode active material having a chemical composition represented by the formula $Li_aNi_bM_cO_d$, where $0.95 \leq a \leq 1.05$; $b+c=1$; $0<c<0.4$; $d=2$; and M is at least one element selected from the group consisting of Co, Mn, Fe, V, Ti, Al, Sn, Zn, Cu, In, Ga, Si, Ge, Sb, B, P, K, Na, Mg, Ca, Ba, Sr, W, Mo, Nb, Ta, Y and a lanthanide, and which has a median diameter ($D_{50}$) of 5 to 30 μm, with a ratio $R=D_{50}/D_S$ being 1.5 to 6, wherein $D_S$ is a specific surface area diameter of the formula $D_S=6/\rho \cdot S$ where ρ measured in g/cm³ is the specific gravity measured with a pycnometer and S measured in m²/g is the BET specific surface area, said positive electrode active material having an initial capacity of at least 150 mAh/g and experiencing a capacity drop of no more than 18 mAh/g after 15 cycles.

20. The nonaqueous electrolyte lithium secondary cell according to claim 19, wherein at least the internal area of said reactor vessel which contacts the shaped parts packed in said reactor vessel is made of a material selected from the group consisting of metallic nickel, a high nickel alloy, a nickel compound and a combination of at least two of said metallic nickel, said high nickel alloy and said nickel compound.

* * * * *